United States Patent
Cymbal et al.

(10) Patent No.: US 7,475,614 B2
(45) Date of Patent: Jan. 13, 2009

(54) TILTABLE STEERING COLUMN

(75) Inventors: William D. Cymbal, Freeland, MI (US); David L. Keaner, Saginaw, MI (US); Philip J. McCarthy, Saginaw, MI (US); Herbert E. Ziehl, Linwood, MI (US)

(73) Assignee: Delphi Technologies, Inc., Troy, MI (US)

( * ) Notice: Subject to any disclaimer, the term of this patent is extended or adjusted under 35 U.S.C. 154(b) by 702 days.

(21) Appl. No.: 11/037,676

(22) Filed: Jan. 18, 2005

(65) Prior Publication Data

US 2006/0169087 A1 Aug. 3, 2006

(51) Int. Cl.
*B62D 1/18* (2006.01)

(52) U.S. Cl. .............................. 74/493; 74/492; 280/775

(58) Field of Classification Search .................... 74/492, 74/493; 280/775, 777
See application file for complete search history.

(56) References Cited

U.S. PATENT DOCUMENTS

| | | | |
|---|---|---|---|
| 4,224,236 A | 9/1980 | Wunder | |
| 4,244,237 A | 1/1981 | Sprunger | |
| 4,279,176 A | 7/1981 | Minamitani | |
| 4,424,721 A | 1/1984 | Deacon | |
| 4,470,322 A | 9/1984 | Beauch | |
| 4,649,769 A | 3/1987 | Venable | |
| 4,656,887 A | 4/1987 | Yoshida | |
| 4,722,241 A | 2/1988 | Yoshida | |
| 4,723,461 A | 2/1988 | Yoshida | |
| 4,892,330 A | 1/1990 | Beauch | |
| 4,972,732 A | 11/1990 | Venable | |
| 4,976,167 A | 12/1990 | Venable | |
| 5,222,410 A | 6/1993 | Kinoshita | |
| 5,339,706 A | 8/1994 | Freeman | |
| 5,409,261 A | * 4/1995 | Yamaguchi | .................. 280/775 |
| 5,566,585 A | 10/1996 | Snell | |
| 5,570,610 A | 11/1996 | Cymbal | |

(Continued)

*Primary Examiner*—Richard W Ridley
*Assistant Examiner*—Matthew Johnson
(74) *Attorney, Agent, or Firm*—Thomas N. Twomey

(57) ABSTRACT

A steering column (10) according to the invention includes a steering column jacket (12) having an engaging surface (14). The steering column jacket (12) is operable to at least partially encircle a steering shaft (16) in a vehicle. The steering column (10) also includes a tilt housing (18) engaged with the steering column jacket (12) for tilting movement about a tilt axis (20) between a plurality of tilt positions. The steering column (10) also includes a locking member (22) pivotally supported at a pivot end (24) by the tilt housing (18). The locking member (22) extends to a distal locking end (26) moveable outwardly from the tilt axis (20) along a first arcuate path (28) to a locked position contacting the engaging surface (14) and inwardly towards the tilt axis (20) along the first arcuate path (28) to an unlocked position spaced from the engaging surface (14). The steering column (10) also includes a lever (30) pivotally supported by the tilt housing (18) for movement along a second arcuate path (32) between a locking position and an adjusting position. The lever (30) and the locking member (22) are disposed in cam-cam follower relationship such that the locking member (22) moves from the unlocked position to the locked position in response to movement of the lever (30) from the adjusting position to the locked position. The locking position of the lever (30) being disposed along the first arcuate path (28) to positively block the locking end (26) from moving along the first arcuate path (28).

8 Claims, 2 Drawing Sheets

U.S. PATENT DOCUMENTS

| | | |
|---|---|---|
| 5,915,726 A | 6/1999 | Hibino |
| 6,035,739 A | 3/2000 | Milton |
| 6,167,777 B1 | 1/2001 | Snell |
| 6,205,882 B1 | 3/2001 | Jolley |
| 6,223,620 B1 | 5/2001 | Jolley |
| 6,244,128 B1 | 6/2001 | Spencer |
| 6,272,945 B1 | 8/2001 | Jolley |
| 6,460,427 B1 | 10/2002 | Hedderly |
| 6,467,367 B2 | 10/2002 | Kim |
| 6,481,310 B2 * | 11/2002 | Janeczko et al. ............ 74/493 |
| 6,591,709 B1 | 7/2003 | Kim |
| 6,640,661 B2 | 11/2003 | Duncan |
| 6,725,739 B2 | 4/2004 | Bannon |
| 6,758,494 B2 | 7/2004 | Bannon |
| 6,986,531 B2 * | 1/2006 | Ohtsu et al. ............... 280/775 |

* cited by examiner

TILTABLE STEERING COLUMN

FIELD OF THE INVENTION

The invention relates to a steering column for a vehicle and more particularly to steering column adjustable between a plurality of tilt positions and lock for fixing the steering column at any one of the plurality of tilt positions.

BACKGROUND OF THE INVENTION

U.S. Pat. No. 6,035,739 discloses an adjustable steering column for a motor vehicle. A mast jacket is engaged with a tilt housing such that the tilt housing is adjustable between a plurality of tilt positions. A lock for locking the tilt housing relative to the mast jacket includes a pair of lock shoes are supported on a journal pin on the tilt housing for pivotal movement. The lock also includes a pair of rigid anchor pins on the mast jacket. The lock shoes pivot in a first direction to engage the anchor pins and define a positive lock between the tilt housing and the mast jacket. The lock shoes pivot in a second direction opposite the first direction to disengage from the anchor pins and unlock the tilt housing and the mast jacket.

SUMMARY OF THE INVENTION AND ADVANTAGES

A steering column according to the invention includes a steering column jacket having an engaging surface. The steering column jacket is operable to at least partially encircle a steering shaft in a vehicle. The steering column also includes a tilt housing engaged with the steering column jacket for tilting movement about a tilt axis between a plurality of tilt positions. The steering column also includes a locking member pivotally supported at a pivot end by the tilt housing. The locking member extends to a distal locking end moveable outwardly from the tilt axis along a first arcuate path to a locked position contacting the engaging surface and inwardly towards the tilt axis along the first arcuate path to an unlocked position spaced from the engaging surface. The steering column also includes a lever pivotally supported by the tilt housing for movement along a second arcuate path between a locking position and an adjusting position. The lever and the locking member are disposed in cam-cam follower relationship such that the locking member moves from the unlocked position to the locked position in response to movement of the lever from the adjusting position to the locked position. The locking position of the lever being disposed along the first arcuate path to positively block the locking end from moving along the first arcuate path.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
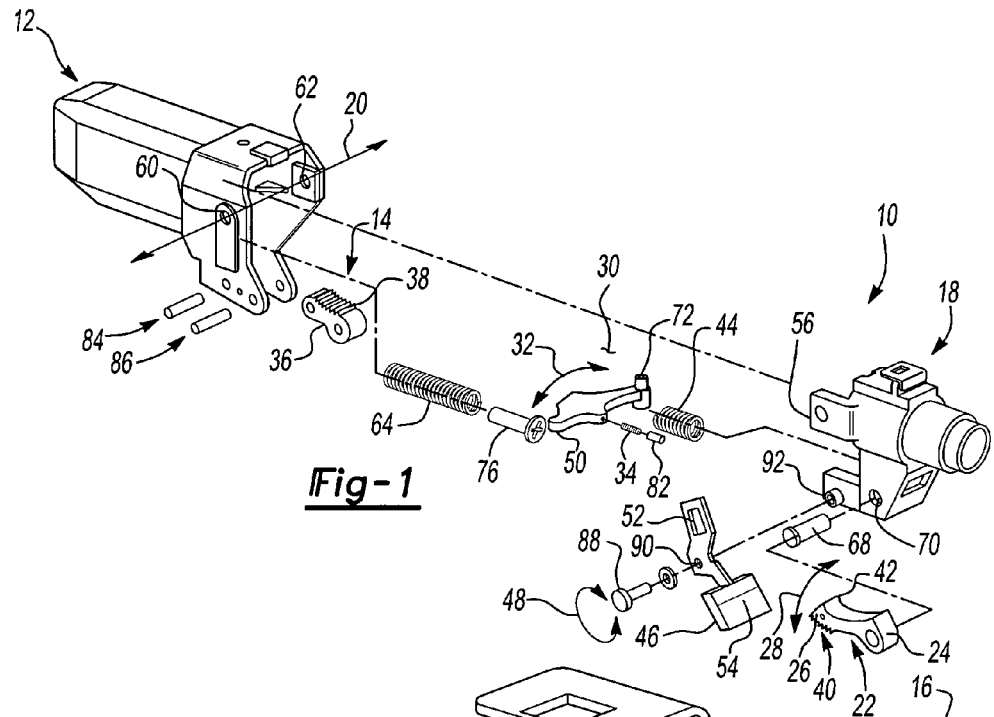
FIG. 1 is an exploded view of the exemplary embodiment of the invention.
Figure 2:
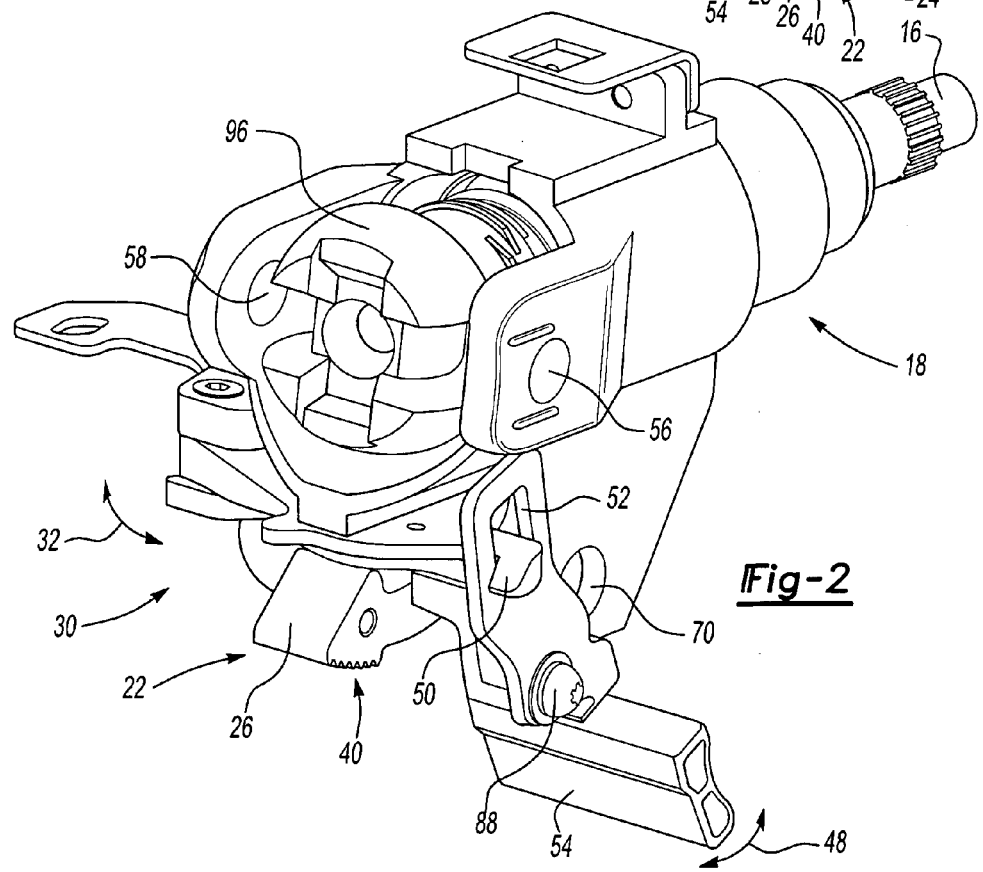
FIG. 2 is a first perspective view of a tilt housing according to the exemplary embodiment of the invention.
Figure 3:
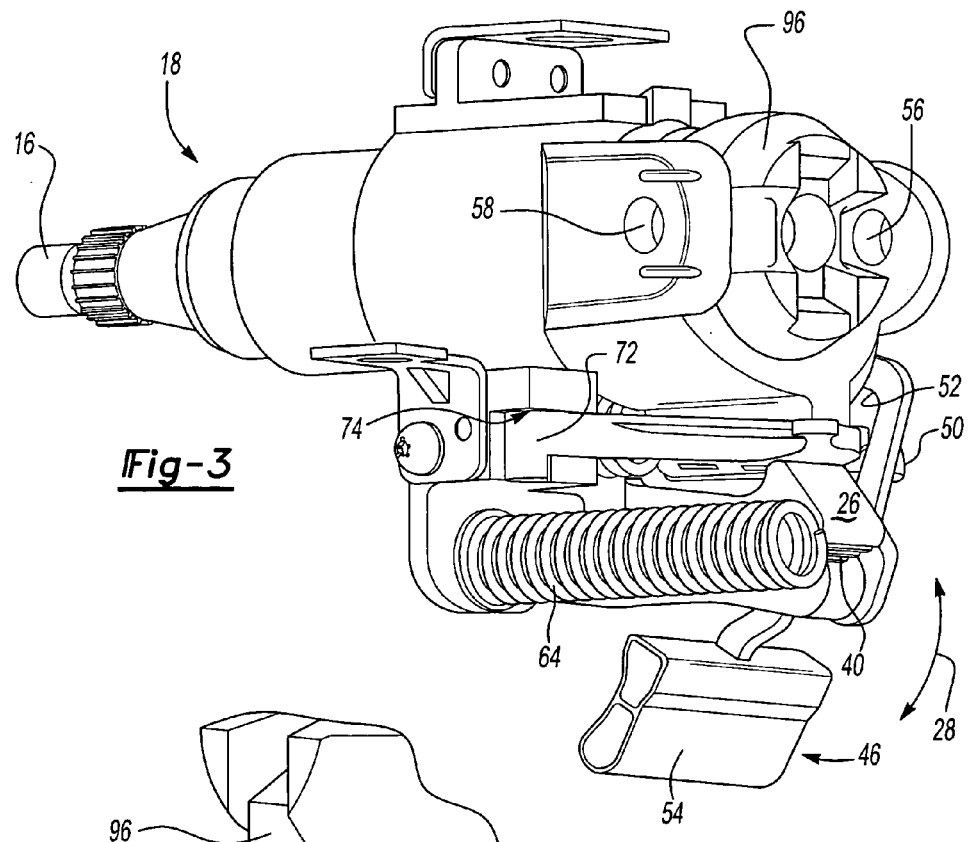
FIG. 3 is a second perspective view of a tilt housing according to the exemplary embodiment of the invention.
Figure 4:
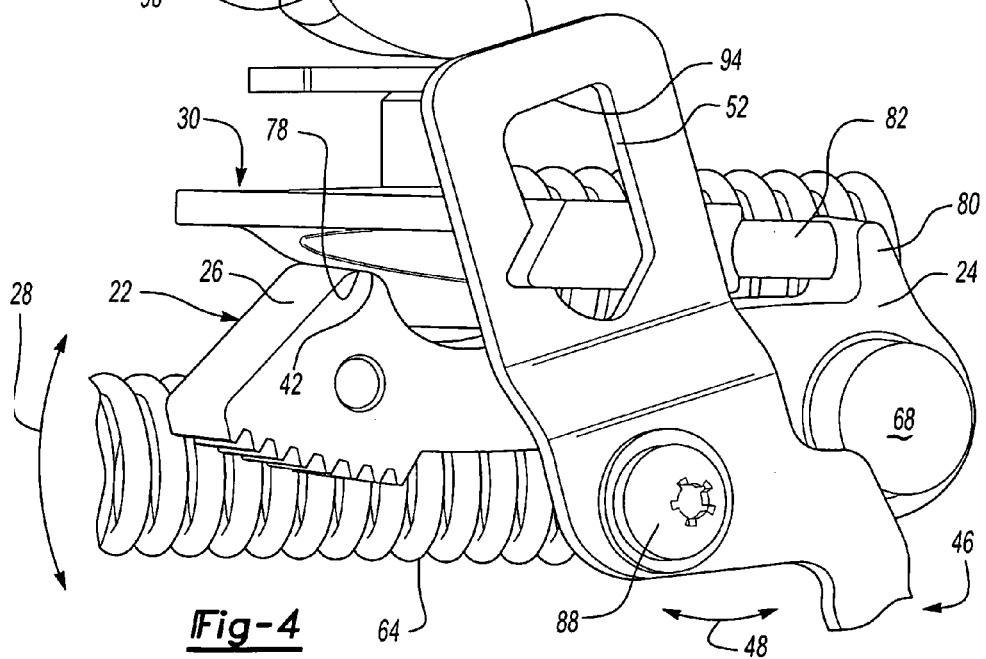
FIG. 4 is a enlarged view of a locking member, lever and handle member according to the exemplary embodiment of the invention.

A steering column 10 according to the invention includes a steering column jacket 12 having an engaging surface 14. The steering column jacket 12 is operable to at least partially encircle a steering shaft 16 in a vehicle. The shaft 16 is associated with a u-joint portion 96. The steering column 10 also includes a tilt housing 18 engaged with the steering column jacket 12 for tilting movement about a tilt axis 20 between a plurality of tilt positions. The steering column 10 also includes a locking member 22 pivotally supported at a pivot end 24 by the tilt housing 18. The locking member 22 extends to a distal locking end 26 moveable outwardly from the tilt axis 20 along a first arcuate path 28 to a locked position contacting the engaging surface 14 and inwardly towards the tilt axis 20 along the first arcuate path 28 to an unlocked position spaced from the engaging surface 14. The steering column 10 also includes a lever 30 pivotally supported by the tilt housing 18 for movement along a second arcuate path 32 between a locking position and an adjusting position. The lever 30 and the locking member 22 are disposed in cam-cam follower relationship such that the locking member 22 moves from the unlocked position to the locked position in response to movement of the lever 30 from the adjusting position to the locked position. The locking position of the lever 30 being disposed along the first arcuate path 28 to positively block the locking end 26 from moving along the first arcuate path 28.

The steering column jacket 12 can be telescopically engaged with another steering column jacket (not shown). The shaft 16 can include a plurality of shafts connected to one another with joints such as u-joints, the plurality of shafts extending through the tilt housing 18 and the steering column jacket 12. Only the top-most portion of the shaft 16 is shown to enhance the clarity of the drawings. A steering wheel is disposed at the top-most portion of the shaft 16.

In the exemplary embodiment of the invention, the tilt housing 18 includes a pair of apertures 56, 58 that are aligned alone the tilt axis 20 with a pair of apertures 60, 62 define by the steering column jacket 12. A first pin (not shown) can be inserted in both the apertures 56, 60 and a second pin (not shown) can be inserted in both the apertures 58, 62 to pivotally connect the tilt housing 18 with the steering column jacket 12. A spring 64 and spring guide 76 is disposed between the tilt housing 18 and the steering column jacket 12 to bias the tilt housing 18 upwardly.

The locking member 22 includes an aperture 66 at the pivot end 24 to receive a pin 68. The pin 68 is also received in an aperture 70 of the tilt housing 18. The locking member 22 rotates about the longitudinal axis of the pin 68. The distal locking end 26 moves outwardly or away from the tilt axis 20 along the first arcuate path 28 when moving from the unlocked position to the locked position. The distal locking end 26 moves towards the tilt axis 20 along the first arcuate path 28 when moving from the locked position to the unlocked position.

The lever 30 includes a pin portion 72 received in an aperture 74 of the tilt housing 18 for movement along the second arcuate path 32 between the locking position and the adjusting position. The first and second arcuate paths 28, 32 intersect at the locked position of the locking member 22. At this point of intersection, the lever 30 is disposed along both of the first and second arcuate paths 28, 30 and positively blocks the locking end 26 from moving back along the first arcuate path 28 towards the unlocked position. A spring 44 is disposed between the tilt housing 18 and the lever 30 and urges the lever to the locking position.

The lever 30 and the locking member 22 are disposed in cam-cam follower relationship. In the exemplary embodiment of the invention, a downwardly facing surface 78 of the lever 30 is a cam and an upwardly facing surface 42 of the locking member 22 is a cam follower. The pivot end 24 of the locking member 22 includes a projection 80 and a spring 34 and pin 82 is disposed between the locking member 22 and the projection 80 and urges the lever 30 and the pivot end 24 apart. The spring 34 also urges the surface 42 of the locking end 26 and the surface 78 of the lever 30 together.

In the exemplary embodiment, the engaging surface 14 is defined by a lock shoe 36 releasibly associated with the steering column jacket 12. The steering column jacket 12 can be applied in different operating environments with different lock shoes. The lock shoe 36 is engaged with the steering column jacket 12 with pins 84, 86. The lock shoe 36 is arcuate and centered on the tilt axis 20. The lock shoe 36 define a first plurality of teeth 38 and the locking member 22 defines a second plurality of teeth 40. The second plurality of teeth 40 engage the first plurality of teeth 38 when the locking member 22 is in the locked position. The first and second pluralities of teeth 38, 40 are spaced from one another when the locking member 22 has been rotated to the unlocked position. The lever 30 contacts the locking end 26 at the surface 42 which is on an opposite side of the locking end 26 with respect to the second plurality of teeth 40.

The exemplary embodiment of the invention includes a handle member 46 pivotally supported by the tilt housing 18 for movement along a third arcuate path 48 between a first position and a second position. A bolt 88 extends through an aperture 90 of the handle member 46 and an aperture 92 of the tilt housing 18 to pivotally connect the handle member 46 and the tilt housing 18 together. The the handle member 46 and the lever 30 are disposed in cam-cam follower relationship such that the lever 30 moves from the adjusting position to the locking position in response to movement of the handle member 46 from the first position to the second position. The lever 30 includes a projection 50 and the handle member 46 includes a slot 52 receiving the projection 50. The slot 52 and the projection 50 cooperate for moving the lever 30 in response to movement of the handle member 46. The lever 30 is limited in movement in one direction by a top 94 of the slot 52. The handle member 46 includes a free end 54 spaced from the pivot axis defined by the bolt 88. The free end 54 moves closer to the steering column jacket 12 during movement from the second position to the first position.

In operation, when the steering column 10 is locked with respect to tilting movement, the locking member 22 is in the locked position, the pluralities of teeth 38, 40 are engaged, the lever 30 is in the locking position at the intersection of the first and second arcuate paths 28, 32, and the handle member 46 is at the second position. To unlock the steering column 10 for tilting adjustment, an operator pushes the free end 54 of the handle member 46 towards the steering column jacket 12 along the third arcuate path 48. The slot 52 is a cam and the projection 50 is a cam follower, the lever 30 rotating away from the intersection of the first and second arcuate paths 28, 32 along the second arcuate path 32. The spring 34 is compressed and cooperates with the projection 80 to urge the locking end 26 away from the lock shoe 36, separating the pluralities of teeth 38, 40. The position of the tilt housing 18 relative to the steering column jacket 12 is adjusted as desired and the free end is released. The spring 44, compressed during movement of the free end 54 towards the steering column jacket 12, urges the lever 30 towards the intersection of the first and second arcuate paths 28, 32 along the second arcuate path 32. The projection 50 is a cam and the slot 52 is a cam follower, the free end 54 rotating away from the steering column jacket 12.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering column (10) for a vehicle comprising:
   a steering column jacket (12) having an engaging surface (14) and operable to at least partially encircle a steering shaft (16) in the vehicle;
   a tilt housing (18) engaged with said steering column jacket (12) for tilting movement about a tilt axis (20) between a plurality of tilt positions;
   a locking member (22) pivotally supported at a pivot end (24) by said tilt housing (18) and extending to a distal locking end (26) moveable outwardly from said tilt axis (20) along a first arcuate path (28) to a locked position contacting said engaging surface (14) and inwardly towards said tilt axis (20) along said first arcuate path (28) to an unlocked position spaced from said engaging surface (14);
   a lever (30) pivotally supported by said tilt housing (18) for movement along a second arcuate path (32) between a locking position and an adjusting position wherein said lever (30) and said locking member (22) are disposed in cam-cam follower relationship such that said locking member (22) moves from said unlocked position to said locked position in response to movement of said lever (30) from said adjusting position to said locked position and wherein said locking position of said lever (30) being disposed along said first arcuate path (28) to positively block said locking end (26) from moving along said first arcuate path (28); and
   a handle member (46) pivotally supported by said tilt housing (18) for movement along a third arcuate path (48) between a first position and a second position wherein said handle member (46) and said lever (30) are disposed in cam-cam follower relationship such that said lever (30) moves from said adjusting position to said locking position in response to movement of said handle member (46) from said first position to said second position;
   said handle member (46) includes a free end (54) spaced from a center of said third arcuate path (48) and a lever adjusting end engaging said lever (30) and spaced from said free end (54) with said center of said third arcuate path (48) disposed between said free end (54) and said lever adjusting end and wherein said free end (54) moves closer to said steering column jacket (12) during movement from said second position to said first position.

2. The steering column (10) of claim 1 further comprising:
   a spring (34) disposed between said locking member (22) and said lever (30) and urging said lever (30) and said pivot end (24) apart.

3. The steering column (10) of claim 2 wherein said spring (34) urges said locking end (26) and said lever (30) together.

4. The steering column (10) of claim 1 wherein said engaging surface (14) is defined by a lock shoe (36) releasibly associated with said steering column jacket (12) and defining a first plurality of teeth (38) wherein said locking member (22) defines a second plurality of teeth (40) engaging said first plurality of teeth (38) when said locking member (22) is in said locked position.

5. The steering column (10) of claim 4 wherein said lever (30) is further defined as contacting said locking end (26) on an opposite surface (42) of said second plurality of teeth (40).

6. The steering column (10) of claim 4 wherein said lock shoe (36) is arcuate and centered on said tilt axis (20).

7. The steering column (10) of claim 1 further comprising a spring (44) disposed between said lever (30) and said tilt housing (18) urging said lever (30) to said locking position.

8. The steering column (10) of claim 1 wherein said lever (30) further comprises a projection (50) and said handle member (46) further comprises a slot (52) receiving said projection (50) wherein said slot (52) and said projection (50) cooperate for moving said lever (30) in response to movement of said handle member (46).

\* \* \* \* \*